Figure 1:
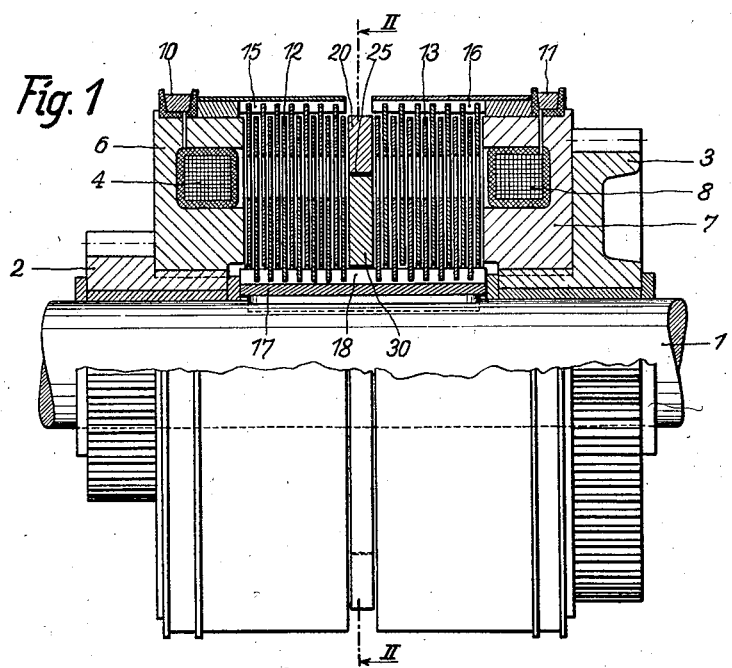

Feb. 10, 1942.  A. MAIER  2,272,570

ELECTROMAGNETIC CLUTCH

Filed March 6, 1940

INVENTOR
ALBERT MAIER

BY *Edward H. Hanyse*
ATTORNEY

Patented Feb. 10, 1942

2,272,570

UNITED STATES PATENT OFFICE 2,272,570.

ELECTROMAGNETIC CLUTCH

Albert Maier, Friedrichshafen, Bodensee, Germany, assignor to Zahnradfabrik Friedrichshafen A.-G., Friedrichshafen, Bodensee, Germany Application March 6, 1940, Serial No. 322,594
In Germany March 6, 1939

6 Claims. (Cl. 192—84)

My invention relates to electro-magnetic clutches having a plurality of friction discs positioned between a circular exciting coil and an armature disc in axial arrangement.

It is usual to provide quite a multitude of comparatively thin friction discs and with these it is difficult to have a uniform pressure all over the area of each individual disc and also between the different discs and the different zones thereof. The unavoidable difference in thickness of the different portions of each individual disc and the fissures filled with air between the different discs cause a varying pressure over the area of the discs, and, consequently, there is no equal distribution of the forces over the different parts of the laminated friction clutch; especially the inner portions of the disc will be under a pressure differing from that of the outer portions. This is, of course, undesirable and influences the efficiency of the clutch.

According to my invention these drawbacks are done away with by subdividing the armature discs into annular portions fitting closely into one another. There may be several ring portions one fitting into the other, but normally it is sufficient and preferable to provide two of them only, the dividing circle being drawn approximately through the middle of the zone of the circular exciting coil. This allows for each portion to be moved axially and to cause pressure on the discs independently of the other. Consequently, the outer zone and the inner zone of the discs will approach and be pressed together uniformly and air fissure between the discs will be avoided.

Having given a general description of my invention I now want to point it out more in detail having reference to the drawing which represents an example embodying my invention.

Fig. 1 in its lower portion is a side view of and in its upper portion an axial cross section through an arrangement of two electro-magnetic clutches adapted to operate alternately.

Figure 2:
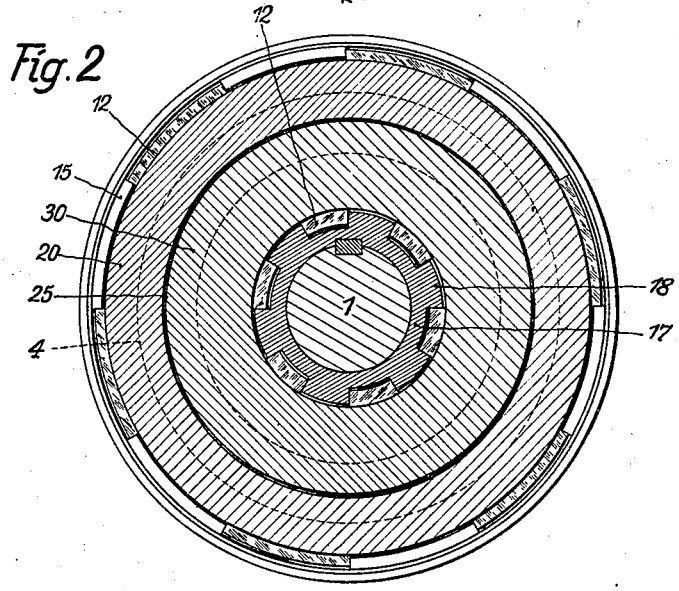

Fig. 2 is a cross section taken on line II—II of Fig. 1.

On shaft 1 there are two gears 2 and 3 loosely journaled. They may alternately be coupled to shaft 1 by means of an electro-magnetic double clutch arrangement.

There are two magnet bodies, 6 and 7, respectively, and two exciting coils, 4 and 8, coil 4 belonging to body 6 and coil 8 to body 7. These magnet bodies are keyed to the gears they belong to, that is body 6 to gear 2 and body 7 to gear 3. There are slip rings 10 and 11 for conducting the electric current to coils 4 and 8, respectively.

Opposite to the coils are two packs 12 and 13 of thin friction discs as usual with clutches of this kind. Part of the discs are in driving connection with outer claw portions 15 and 16 belonging to bodies 6 and 7, respectively, and the intermediate discs are in driving connection with bush 17 keyed to shaft 1.

Between the two disc packs 12 and 13 an armature consisting of two ring portions 20 and 30 is situated. This armature is adapted to be attracted by coil 4 or by coil 8 alternately, thereby pressing together pack 12 or pack 13 and causing driving connection between shaft 1 and gear 2 or between shaft 1 and gear 3, respectively.

These armature rings 20 and 30 are free to move axially and they are not in driving connection with bush 17, but ring 30 fits closely around the keys 18 on this bush 17 and ring 20 fits closely around ring 30, both rings meeting in the outer surface of a circular cylinder indicated at 25 and being situated substantially opposite to the middle of coils 4 and 8.

Now, if, for engagement of one of the clutches, one of the coils is excited the armature is attracted in the respective direction. As this armature is composed of two rings 20 and 30 adapted to be moved in axial direction independently of each other all irregularities in pressure on the discs and any air fissures between the discs are avoided. The expansion because of heat in the different zones of the discs is thus made ineffective or at least rendered harmless.

I do not want to be limited to the details described or shown in the drawing as many variations will occur to those skilled in the art without deviating from the scope of my invention.

What I claim is:

1. An electro-magnetic plate clutch comprising a first rotatable member, a second rotatable member, a pack of annular clutch plates, certain plates of said pack being secured for rotation with the first rotatable member and other plates of said pack being secured for rotation with the second rotatable member, and a plurality of electro-magnetically actuated members capable of relative movement for compressing the inner and outer portions of all said annular clutch plates of said pack.

2. An electro-magnetic plate clutch comprising a first rotatable member, a second rotatable member, a pack of annular clutch plates, certain plates of said pack being secured for rotation with the first rotatable member and other plates of said pack being secured for rotation with the second rotatable member, a plurality of electro-magnetically actuated members capable of relative movement for compressing the inner and outer portions of all said annular clutch plates of said pack, and common electro-magnetic means for actuating said members.

3. An electro-magnetic plate clutch comprising a first rotatable member, a second rotatable member, a pack of annular clutch plates, certain plates of said pack being secured for rotation with the first rotatable member and other plates of said pack being secured for rotation with the second rotatable member, and a plurality of electro-magnetically actuated rings, one surrounding another and capable of relative movement for independently compressing different annular portions of all said clutch plates of said pack.

4. An electro-magnetic plate clutch comprising a first rotatable member, a second rotatable member, a pack of annular clutch plates, certain plates of said pack being secured for rotation with the first rotatable member and other plates of said pack being secured for rotation with the second rotatable member, a plurality of electro-magnetically actuated rings, one surrounding another and capable of relative movement for independently compressing different annular portions of all said clutch plates of said pack, and a common annular electro-magnetic coil axially offset from said rings for actuating said rings.

5. An electro-magnetic plate clutch comprising a first rotatable member, a second rotatable member, a pack of annular clutch plates, certain plates of said pack being secured for rotation with the first rotatable member and other plates of said pack being secured for rotation with the second rotatable member, and closely fitting inner and outer concentric electro-magnetically actuated rings located at one end of the clutch pack capable of relative movement for independently compressing the inner and outer portions of all said clutch plates of said pack, and a common annular electro-magnetic coil at the other end of said clutch pack for actuating said rings, the annular meeting surface of said rings being positioned substantially opposite the middle circle of said coil.

6. An electro-magnetic plate clutch comprising a rotatable member, a pair of axially spaced clutch parts capable of rotation independently of said rotatable member, electro-magnetic coils carried by the respective clutch parts, a plurality of packs of annular clutch plates arranged end to end, one clutch pack having certain of its plates secured for rotation with the rotatable member and other of its plates secured for rotation with one of said clutch parts, the other clutch pack also having certain of its plates secured for rotation with the rotatable member and having other of its plates secured for rotation with the other said clutch part, and an armature disposed between the clutch packs for selectively compressing the respective clutch packs upon energization of the respective electro-magnetic coils, said armature comprising a plurality of rings fitting one within another and being capable of independent axial movement to independently compress different annular portions of the respective clutch packs.

ALBERT MAIER.